(12) United States Patent
Kumar

(10) Patent No.: US 11,002,107 B2
(45) Date of Patent: May 11, 2021

(54) ANNULAR BARRIER WITH A VALVE SYSTEM

(71) Applicant: WELLTEC OILFIELD SOLUTIONS AG, Zug (CH)

(72) Inventor: Satish Kumar, Zug (CH)

(73) Assignee: Welltec Oilfield Solutions AG, Zug (CH)

( * ) Notice: Subject to any disclaimer, the term of this patent is extended or adjusted under 35 U.S.C. 154(b) by 0 days.

(21) Appl. No.: 16/776,827

(22) Filed: Jan. 30, 2020

(65) Prior Publication Data
US 2020/0248530 A1 Aug. 6, 2020

(30) Foreign Application Priority Data
Jan. 31, 2019 (EP) .................................... 19154885

(51) Int. Cl.
*E21B 33/127* (2006.01)
*E21B 34/06* (2006.01)
(Continued)

(52) U.S. Cl.
CPC .......... *E21B 34/063* (2013.01); *E21B 33/127* (2013.01); *E21B 34/08* (2013.01);
(Continued)

(58) Field of Classification Search
CPC .... E21B 33/1243; E21B 33/127; E21B 34/08; E21B 34/10; E21B 34/103; E21B 34/063; F16K 11/10
See application file for complete search history.

(56) References Cited

U.S. PATENT DOCUMENTS 3,503,455 A * 3/1970 Oerman ............... A01B 61/042
  172/271
2014/0216755 A1* 8/2014 Hallundaek ......... E21B 33/1243
  166/373

(Continued)

FOREIGN PATENT DOCUMENTS

EP 2 876 252 5/2015
EP 3 327 246 5/2018

OTHER PUBLICATIONS

Extended Search Report for EP19154885.8 dated Aug. 6, 2019, 7 pages.

*Primary Examiner* — Yong-Suk (Philip) Ro
(74) *Attorney, Agent, or Firm* — Nixon & Vanderhye P.C.

(57) ABSTRACT

The present invention relates to an annular barrier for providing zonal isolation in an annulus in a well downhole between a well tubular metal structure and another well tubular metal structure or a wall of a borehole, comprising a tubular metal part configured to be mounted as part of the well tubular metal structure, an expandable metal sleeve connected with and surrounding the tubular metal part forming an annular space there between, the expandable metal sleeve is configured to be expanded in the well downhole from a first outer diameter to a second outer diameter to abut against the well tubular metal structure or the wall of the borehole, and an expansion opening in the tubular metal part wherein the annular barrier further comprises a valve system comprising an isolation valve having a first position and a second, comprising an isolation bore, an isolation piston arranged in the isolation bore dividing the bore into a first bore part and a second bore part in the first position, the isolation piston is maintained in the first position by a shear element configured to break at a predetermined pressure difference between the first bore part and the second bore part, a first aperture arranged in the first bore (Continued)

Figure 1:
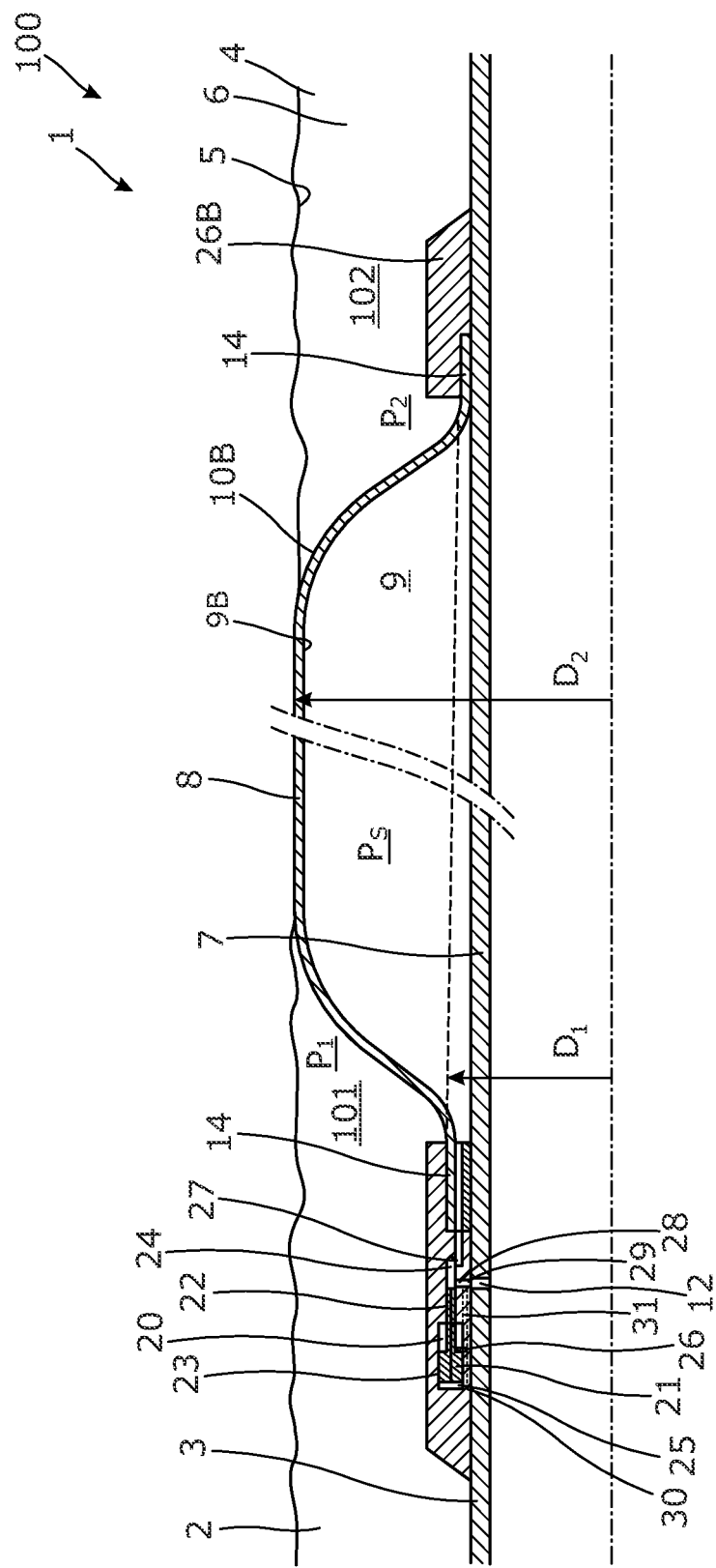

part and being in fluid communication with the annular space, a second aperture arranged in the first bore part and being in fluid communication with the expansion opening through a first fluid channel, a third aperture arranged in the second bore part and being in fluid communication with the expansion opening through a second fluid channel, wherein in the first position the first aperture is in fluid communication with the second aperture, and in the second position the isolation piston prevents fluid communication between the first aperture and the second aperture.

15 Claims, 5 Drawing Sheets

(51) Int. Cl.
*F16K 11/10* (2006.01)
*E21B 34/10* (2006.01)
*E21B 34/08* (2006.01)
*E21B 33/124* (2006.01)

(52) U.S. Cl.
CPC ............ *E21B 34/10* (2013.01); *E21B 34/103* (2013.01); *F16K 11/10* (2013.01); *E21B 33/1243* (2013.01)

(56) References Cited

U.S. PATENT DOCUMENTS

| | | | |
|---|---|---|---|
| 2016/0053568 A1* | 2/2016 | Saltel | E21B 23/06 166/179 |
| 2017/0145779 A1* | 5/2017 | Hazel | E21B 47/06 |
| 2017/0211347 A1 | 7/2017 | Vasques | |
| 2017/0321515 A1* | 11/2017 | Staehr | E21B 34/063 |

* cited by examiner

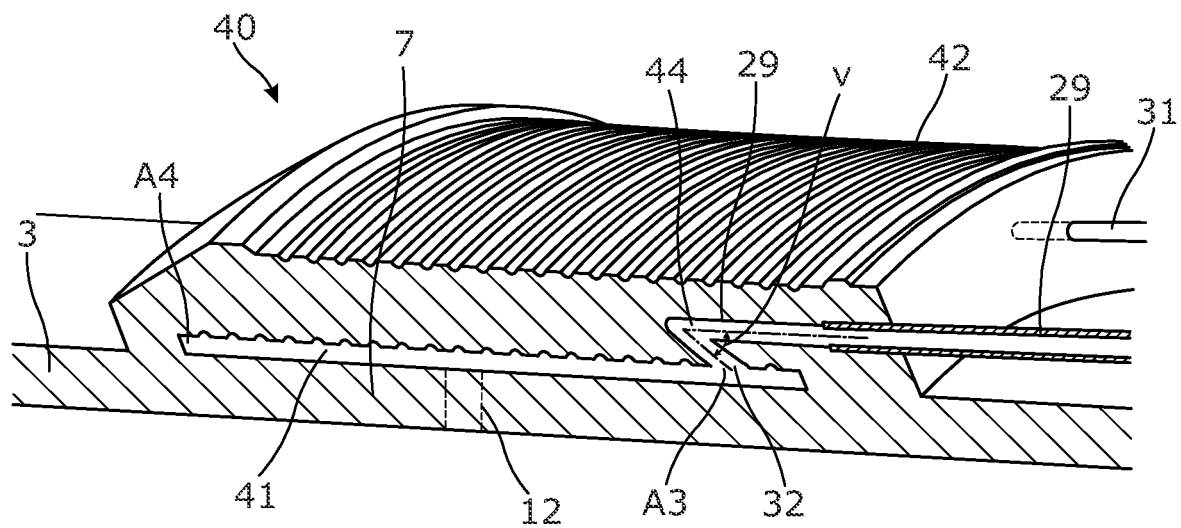
Fig. 5
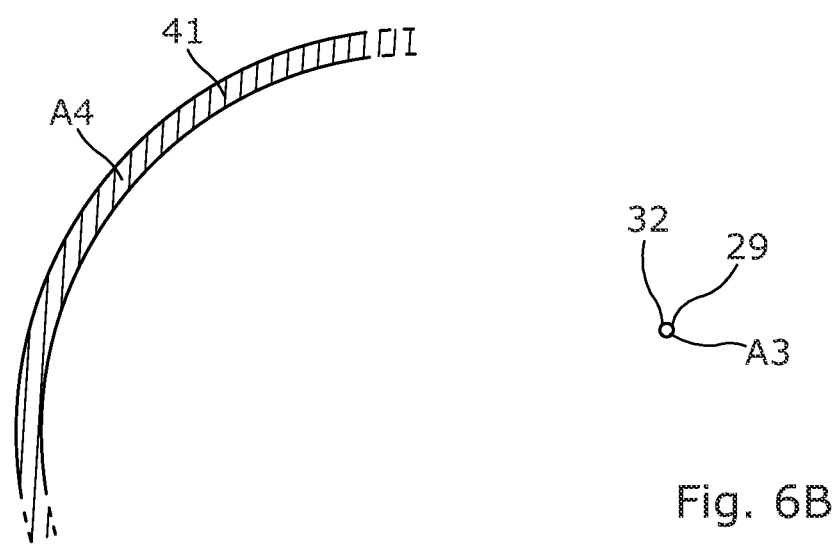
Fig. 6A
Fig. 6B

ANNULAR BARRIER WITH A VALVE SYSTEM

This application claims priority to EP Patent Application No. 19154885.8 filed Jan. 31, 2019, the entire contents of which are hereby incorporated by reference.

The present invention relates to an annular barrier for providing zonal isolation in an annulus in a well downhole between a well tubular metal structure and another well tubular metal structure or a wall of a borehole. The invention also relates to a downhole system.

One of the important steps when completing a well is to provide zonal isolation so that a water producing zone can be isolated from a hydrocarbon producing zone. Zonal isolation may be performed by using swell packers; however, swell packers may swell too soon so that they are not set in the right position, and the production casing or liner may be stuck before reaching its predetermined position in the borehole. Metal annular barriers do not set too soon as the metal sleeve surrounding the casing/liner is firstly expanded when the metal annular barriers are situated in the intended positions by pressurising the casing from within and allowing fluid into the annular barrier through an expansion opening in the casing.

When expanding the expandable metal sleeve of the annular barriers, the expandable metal sleeves are expanded until they abut the wall of the borehole or the wall of another well tubular metal structure. The inner diameter of the well tubular metal structure is known; however, the borehole may vary unknowingly in diameter where so-called washouts may occur where the diameter of the borehole is larger than intended. In the event that the expandable metal sleeve of an annular barrier is expanded opposite a washout, and until it abuts the wall of the borehole, there is a risk that the expandable metal sleeve will burst before abutting the wall as the expandable metal sleeve is pre-designed to a certain inner diameter of the borehole. In the event the expandable metal sleeve breaks, the borehole may become in direct fluid communication with the inside of the casing. The metal annular barriers are often provided with a valve; however, the valves do not always close if the expandable metal sleeve breaks during expansion.

It is an object of the present invention to wholly or partly overcome the above disadvantages and drawbacks of the prior art. More specifically, it is an object to provide an improved annular barrier having an expandable metal sleeve which is capable of isolating the well tubular metal structure from the borehole in the event that the expandable metal sleeve should burst during expansion.

The above objects, together with numerous other objects, advantages and features, which will become evident from the below description, are accomplished by a solution in accordance with the present invention by an annular barrier for providing zonal isolation in an annulus in a well downhole between a well tubular metal structure and another well tubular metal structure or a wall of a borehole, comprising:
- a tubular metal part configured to be mounted as part of the well tubular metal structure,
- an expandable metal sleeve connected with and surrounding the tubular metal part forming an annular space therebetween, the expandable metal sleeve is configured to be expanded in the well downhole from a first outer diameter to a second outer diameter to abut against the well tubular metal structure or the wall of the borehole, and
- an expansion opening in the tubular metal part wherein the annular barrier further comprises a valve system comprising:
- an isolation valve having a first position and a second position, comprising:
  - an isolation bore,
  - an isolation piston arranged in the isolation bore dividing the bore into a first bore part and a second bore part in the first position, the isolation piston is maintained in the first position by a shear element configured to break at a predetermined pressure difference between the first bore part and the second bore part,
  - a first aperture arranged in the first bore part and being in fluid communication with the annular space,
  - a second aperture arranged in the first bore part and being in fluid communication with the expansion opening through a first fluid channel,
  - a third aperture arranged in the second bore part and being in fluid communication with the expansion opening through a second fluid channel,
wherein in the first position the first aperture is in fluid communication with the second aperture, and in the second position the isolation piston prevents fluid communication between the first aperture and the second aperture.

Thus, the isolation valve having the first position and the second position is configured to isolate the annular space from the expansion opening if the expandable metal sleeve breaks during expansion by moving to the second position.

Furthermore, the first fluid channel may comprise a flow restriction.

In addition, the first fluid channel may provide a flow restriction providing a pressure decrease in the first bore part compared to the second bore part if the expandable metal sleeve breaks, providing the predetermined pressure difference causing the shear element to break.

Moreover, if the expandable metal sleeve breaks, an increased flow through the first fluid channel may occur.

In addition, the increased flow through the first channel may cause a lower pressure in the first fluid channel than in the second fluid channel creating the predetermined differential pressure across the isolation piston.

Further, the isolation piston may have a first piston end facing the first bore part and a second piston end facing the second bore part, the first piston end having a projected area being of substantially the same size as a projected area of the second piston end.

Also, the isolation piston may have at least one sealing element arranged on an outer face of the isolation piston for increasing the sealing ability between the isolation piston and an inner face of the isolation bore.

Additionally, the first fluid channel may provide the flow restriction by having a decrease in a cross-sectional flow area of the first fluid channel.

Furthermore, the first fluid channel may have increased cross-sectional flow area upstream of the second aperture.

Moreover, the shear element may be a shear pin engaging the isolation piston.

Further, the first fluid channel may provide the flow restriction by comprising a bend so that the first fluid channel forms an angle of less than 90°.

In addition, the isolation valve may comprise a fourth aperture which is in fluid communication with the annulus.

Also, the isolation valve may further comprise a locking element adapted to mechanically lock the isolation piston when the isolation piston is in the closed position, blocking the second aperture.

Furthermore, the locking element may be configured to move at least partly radially outwards or inwards upon movement of the isolation piston away from the initial position to prevent the isolation piston from returning to an initial position of the isolation piston.

Additionally, the locking element may permanently lock the isolation piston in a closed position.

Moreover, the valve system may further comprise a diverter unit in fluid communication with the expansion opening, the diverter unit dividing fluid from the expansion opening to the first fluid channel and the second fluid channel.

Further, the diverter unit may comprise a unit chamber receiving fluid from the expansion opening and may be in fluid communication with the first fluid channel and the second fluid channel.

In addition, the unit chamber may be annular extending on the outside of the tubular metal part.

Furthermore, the first fluid channel may provide the flow restriction by having a cross-sectional flow area smaller than a cross-sectional flow area of the unit chamber.

Also, the diverter unit may comprise a filtering element for filtering fluid from the expansion opening before the fluid is diverted into the first fluid channel and the second fluid channel.

Additionally, the flow restriction of the first fluid channel may be arranged in the diverter unit.

Moreover, the valve system may further comprise a closing valve comprising:
 a first opening in fluid communication with the expansion opening,
 a second opening in fluid communication with the annular space, and
 a valve bore having a bore extension and comprising a first bore part having a first inner diameter and a second bore part having a second inner diameter which is larger than that of the first bore part,
wherein the first opening and the second opening are arranged in the first bore part and displaced along the bore extension, the closing valve further comprising:
 a valve piston arranged in the bore, the valve piston comprising a first piston part having an outer diameter substantially corresponding to the inner diameter of the first bore part and comprising a second piston part having an outer diameter substantially corresponding to the inner diameter of the second bore part, and
 a rupture element preventing movement of the valve piston until a predetermined pressure in the valve bore is reached.

In addition, the first fluid channel may extend through the first opening, the first bore part of the closing valve, and the second opening to the second aperture.

Further, the closing valve may further comprise a locking element adapted to mechanically lock the valve piston when the valve piston is in the closed position, blocking the first opening.

Also, the locking element may be configured to move at least partly radially outwards or inwards upon movement of the piston away from the initial position to prevent the valve piston from returning to an initial position of the valve piston.

Additionally, the locking element may permanently lock the valve piston in a closed position.

Furthermore, the valve piston may comprise a piston fluid channel being a through bore providing fluid communication between the first and second bore parts.

Moreover, the valve piston may have a centre axis arranged in a wall of the tubular part or in a wall of a connection part connecting ends of the expandable metal sleeve with the tubular part.

In addition, the annular barrier may comprise a third opening which is in fluid communication with the annulus.

Further, the piston may have an initial position in which the first opening is in fluid communication with the second opening, and a closed position in which the second opening is in fluid communication with the third opening in order to equalise the pressure between the annular space and the annulus.

Also, the rupture element may be a shear pin engaging the piston.

Additionally, when expanded the annular barrier may divide the annulus into a first zone and a second zone, said annular barrier further comprising an anti-collapsing unit, the anti-collapsing unit having a first inlet which is in fluid communication with the first zone and a second inlet which is in fluid communication with the second zone, and the anti-collapsing unit having an outlet which is in fluid communication with the annular space, and in a first position, the first inlet is in fluid communication with the outlet, equalising the first pressure of the first zone with a space pressure of the annular space, and in a second position, the second inlet is in fluid communication with the outlet, equalising the second pressure of the second zone with the space pressure.

Furthermore, the outlet may be in fluid communication with the annular space through the third opening and/or the fourth aperture.

Moreover, the outlet may be fluidly connected with the fourth aperture via a connecting fluid channel and the third opening.

In addition, the anti-collapsing unit may comprise an element which is movable at least between a first position and a second position.

Also, the isolation piston may comprise three sealing elements arranged with a mutual distance between both the first and the second sealing elements and the second and third sealing elements along an outer face of the isolation piston.

Additionally, the mutual distance may be equal to or larger than the second opening.

Furthermore, the isolation piston may comprise three sealing elements arranged with a mutual distance along an outer face of the isolation piston so that the first and third sealing elements sealingly engage an inner face when straddling over the second opening.

Moreover, the isolation piston may comprise a first, a second and a third sealing element arranged with a mutual distance along an outer face of the isolation piston, and when moving past the second opening, the first sealing element is arranged so that the first sealing element having passed the second opening engages with an inner face of the isolation bore before the third sealing element moves past the second opening so that the first sealing element is pressure equalised experiencing the expansion pressure on both sides of the first sealing element even after the second sealing element engages the inner face after having passed the second opening as the first and second sealing element isolate the expansion pressure between them.

In addition, the present invention relates to a downhole system comprising the annular barrier and the well tubular metal structure.

Finally, the well tubular metal structure may comprise an inflow control section.

Figure 2:
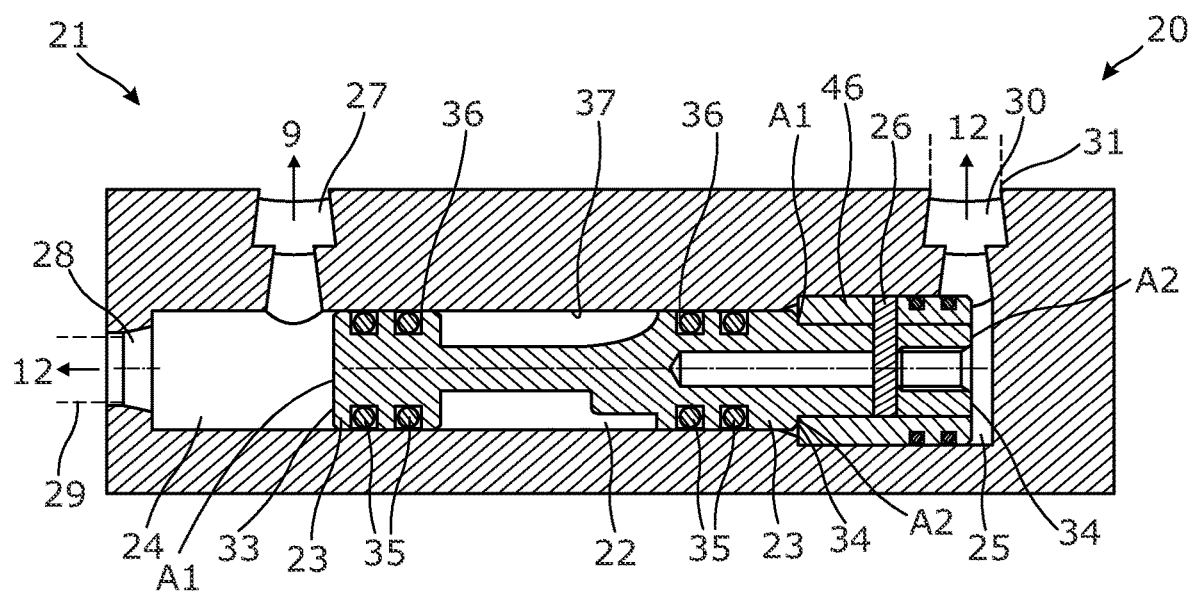
Figure 3:
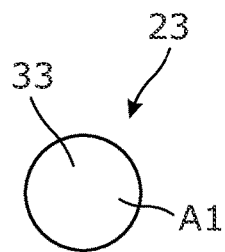
Figure 4:
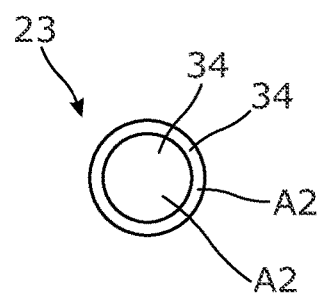
Figure 7:
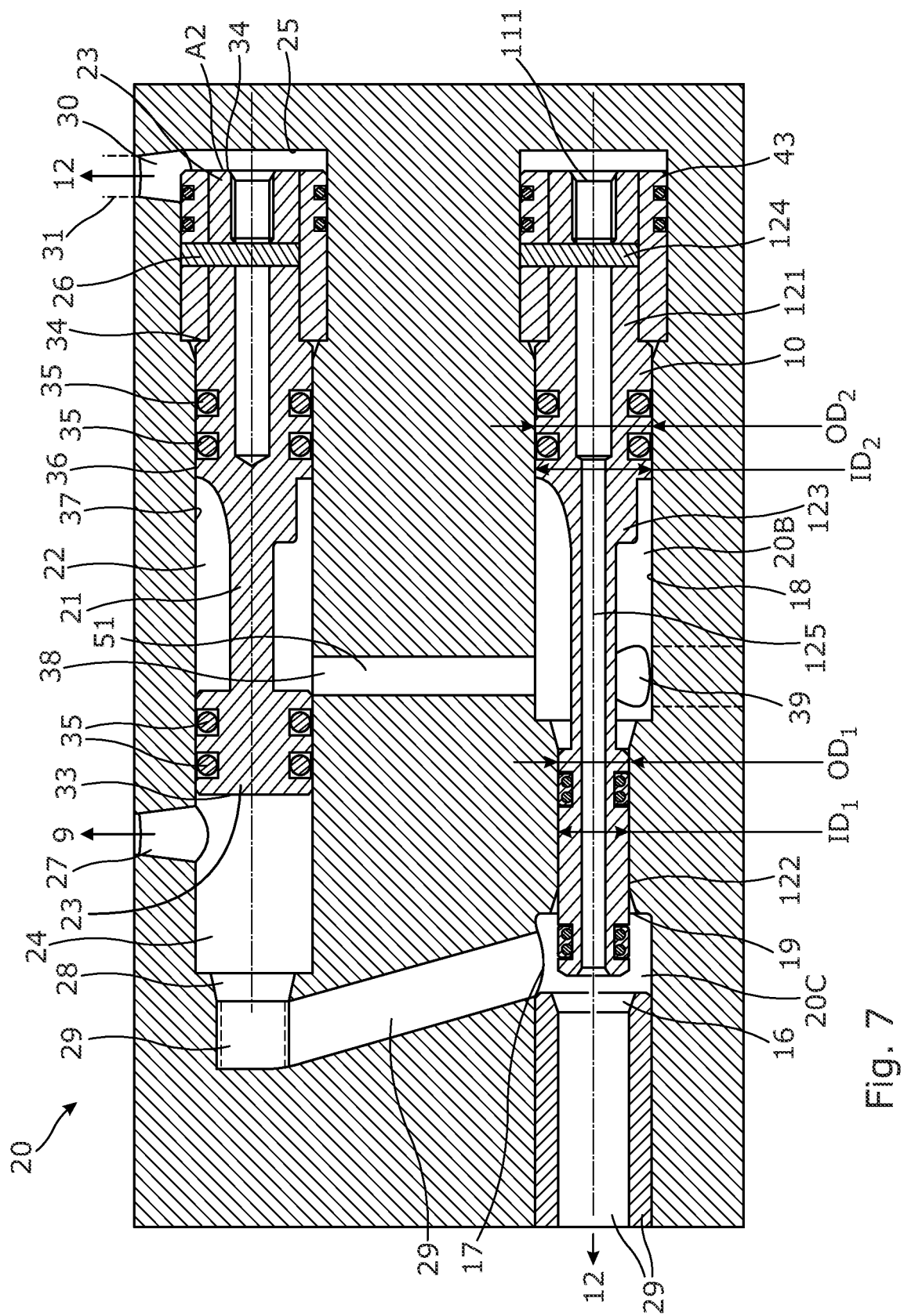
Figure 8:
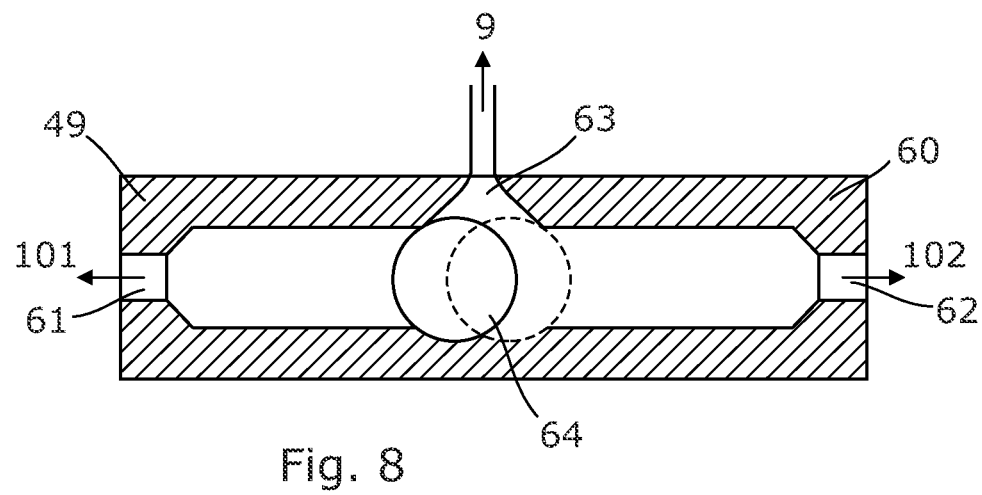
Figure 9:
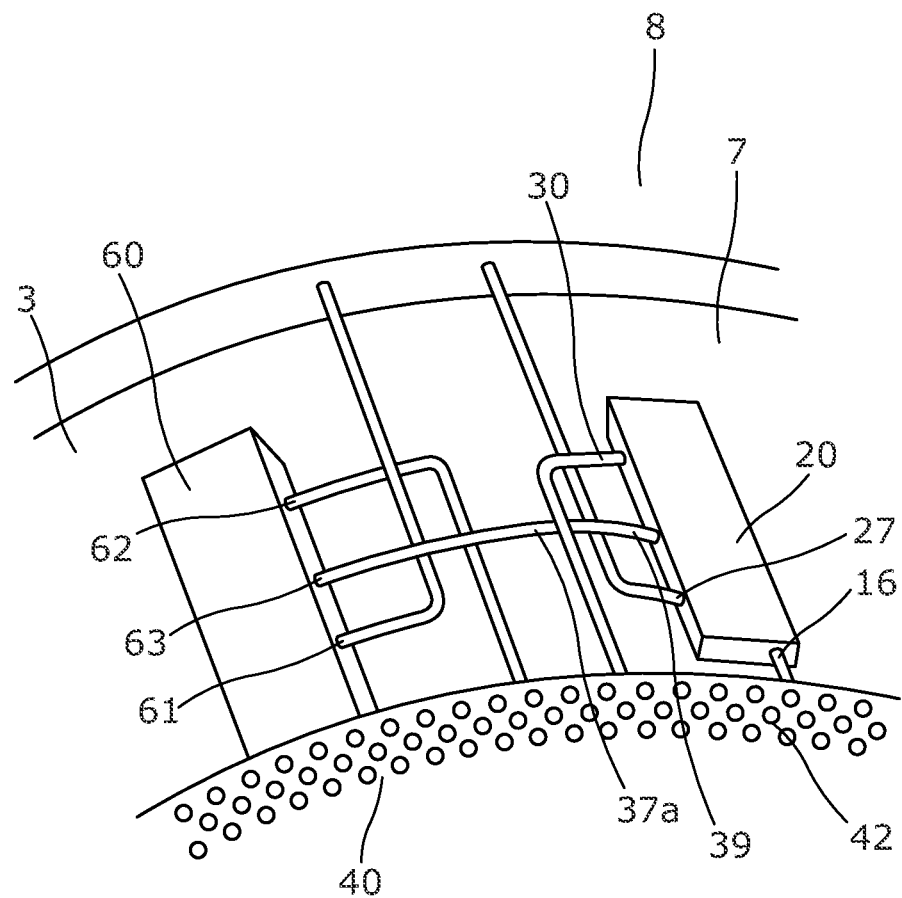

The invention and its many advantages will be described in more detail below with reference to the accompanying schematic drawings, which for the purpose of illustration show some non-limiting embodiments and in which:

FIG. 1 shows a cross-sectional view of an annular barrier having a valve system, FIG. 2 shows a cross-sectional view of a valve system, FIG. 3 shows an isolation piston seen from one end, and FIG. 4 shows the isolation piston of FIG. 3 seen from the other end, FIG. 5 shows part of a diverter unit in perspective and in cross-section, FIG. 6A shows a cross-sectional area of a unit chamber of the diverter of FIG. 5, FIG. 6B shows a cross-sectional flow area of the flow restriction, FIG. 7 shows a cross-sectional view of another valve system, FIG. 8 shows a partly cross-sectional view of an anti-collapsing unit, and FIG. 9 shows part of the annular barrier having another valve system in perspective.

All the figures are highly schematic and not necessarily to scale, and they show only those parts which are necessary in order to elucidate the invention, other parts being omitted or merely suggested.

FIG. 1 shows an annular barrier 1 for providing zonal isolation in an annulus 2 in a well 6 downhole between a well tubular metal structure 3 and a wall 5 of a borehole 4 or in another embodiment to another well tubular metal structure (not shown). FIG. 1 shows the annular barrier in its expanded condition where an outer face 10B of an expandable metal sleeve 8 abuts the wall 5 of a borehole. The annular barrier 1 comprises a tubular metal part 7 configured to be mounted as part of the well tubular metal structure 3, and the expandable metal sleeve 8 is connected with and surrounds the tubular metal part 7 forming an annular space 9 therebetween. The expandable metal sleeve 8 is configured to be expanded in the well downhole from a first outer diameter $D_1$ (illustrated by dotted lines in FIG. 1) to a second outer diameter $D_2$ to abut against the wall of the borehole, as shown. The annular barrier 1 further comprises an expansion opening 12 in the tubular metal part 7 arranged in fluid communication with a valve system 20. The valve system comprises an isolation valve 21 having a first position and a second position, and the isolation valve is configured to isolate the annular space from the expansion opening if the expandable metal sleeve breaks during expansion by moving from the first position to the second position.

In the end of expansion, part of the outer face 10B of the expandable metal sleeve 8 abuts the wall of the borehole in order to provide a seal therebetween. However, if the borehole is larger than expected at that position, the expandable metal sleeve has to stretch even more for the outer face 10B to abut the wall 5 of the borehole 4. In such a situation, the expandable metal sleeve may lose its strength and rupture, causing the expansion fluid to flow out of this rupture. If several annular barriers are to be expanded in same run and the same expansion fluid, then the other annular barriers cannot be expanded as the expansion fluid flows out of the rupture. However, by having an isolation valve 21 able to close for fluid communication to the ruptured expandable metal sleeve, the expansion procedure can continue as the expansion fluid does no longer flow out of the ruptured annular barrier but can build up pressure to continue the expansion of the other annular barriers without having to go down and seal off the opening in the tubular metal part of the ruptured annular barrier.

As shown in FIG. 2, the isolation valve 21 comprises an isolation bore 22 and an isolation piston 23 arranged in the isolation bore dividing the bore into a first bore part 24 and a second bore part 25. The isolation piston 23 of the isolation valve 21 is maintained in the first position by a shear element 26 configured to break/shear at a predetermined pressure difference between the first bore part and the second bore part, i.e. at a predetermined pressure difference across the isolation piston. The isolation valve comprises a first aperture 27 arranged in the first bore part 24, and the first aperture is in fluid communication with the annular space. The isolation valve further comprises a second aperture 28 arranged in the first bore part 24 and being in fluid communication with the expansion opening 12 through a first fluid channel 29, and the isolation valve 21 comprises a third aperture 30 arranged in the second bore part and being in fluid communication with the expansion opening 12 through a second fluid channel 31. The first fluid channel provides a flow restriction 32 (shown in FIG. 5) providing a pressure decrease in the first bore part compared to the second bore part if the expandable metal sleeve breaks as the flow of fluid then increases in the first fluid channel compared to the second fluid channel. Thus, when the expandable metal sleeve bursts, the flow rate increases, providing the predetermined pressure difference between the first bore part 24 and the second bore part 25 across the isolation piston, causing the shear element to break and allowing the higher pressure in the second bore part 25 to push the isolation piston 23 to the second position isolating the first aperture 27 from the second aperture 28. Thus, if the expandable metal sleeve breaks, the flow through the first fluid channel 29 increases, and due to the flow restriction provided by the first fluid channel, a lower pressure, i.e. a pressure drop, is formed along the first fluid channel in which the pressure is lower than the pressure in the second fluid channel creating the predetermined differential pressure across the isolation piston. Before rupture of the expandable metal sleeve, the pressure in the second fluid channel is substantially the same as the pressure in the first fluid channel since the expansion pressure builds up in both channels. When the expandable metal sleeve ruptures/breaks, the pressure in the first flow channel will drop very suddenly.

By having a first fluid channel providing the flow restriction, a sufficient pressure difference for breaking the breakable element can be created by the increased flow rate occurring as a result of the burst expandable metal sleeve. The burst of the expandable metal sleeve creates a sudden change in flow rate which is used to close fluid communication from the expansion opening 12 to the annular space.

In FIG. 2, the isolation piston 23 has a first piston end 33 facing the first bore part 24 and a second piston end 34 facing the second bore part 25, and the first piston end 33 has a projected area A1 being of substantially the same size as a projected area A2 of the second piston end. In FIG. 3, the isolation piston 23 is seen from the first piston end 33 looking at the projected area A1, and in FIG. 4, the isolation piston 23 is seen from the second piston end 34 looking at the projected area A2. By having the same size of projected areas of the first and second piston ends, the pressure difference across the isolation piston 23 only has to overcome the strength of the breakable element in order to move the isolation piston to the second and closed position, isolating the first aperture from the second aperture so that the borehole is isolated from the inside of the well tubular metal structure.

The isolation piston 23, as shown in FIG. 2, has four sealing elements 35 arranged on an outer face 36 of the isolation piston for increasing the sealing ability between the isolation piston and an inner face 37 of the isolation bore 22. The isolation piston 23 has a first piston part 122 and a second piston part 123, and each part has two of the four sealing elements.

In FIG. 2, the isolation valve 21 further comprises a locking element 46 adapted to mechanically lock the isolation piston 23 when the isolation piston is in the second and closed position, i.e. has moved from the first position to the second position, blocking the second aperture 28. The locking element 46 is configured to move at least partly radially outwards or inwards upon movement of the isolation piston away from the initial first position to prevent the isolation piston 23 from returning to the first position of the isolation piston. Thus, the locking element permanently locks the isolation piston in a closed second position. The shear element 26 is a shear pin engaging the isolation piston 23 and thus maintaining the isolation piston until the predetermined pressure difference across the piston 23 is obtained at which the shear pin breaks.

In FIG. 5, the valve system further comprises a diverter unit 40 in fluid communication with the expansion opening 12. The diverter unit divides fluid from the expansion opening 12 into the first fluid channel 29 and into the second fluid channel 31. The diverter unit comprises a unit chamber 41 receiving fluid from the expansion opening 12 and in fluid communication with the first fluid channel 29 and the second fluid channel 31. The unit chamber 41 is annularly extending on the outside of the tubular metal part 7. The first fluid channel 29 provides the flow restriction 32 by having a cross-sectional flow area A3 smaller than a cross-sectional flow area A4 of the unit chamber 41. The cross-sectional flow area A3 of the flow restriction 32 is shown in FIG. 6A, and the cross-sectional flow area A4 of the annular unit chamber 41 is illustrated in FIG. 6B. By comparing the cross-sectional flow area A3 with the cross-sectional flow area A4, it is apparent that the the cross-sectional flow area A3 is much smaller than that of the cross-sectional flow area A4, creating a pressure difference between the first fluid channel 29 and the second fluid channel 31, as shown in FIG. 5. As can be seen, the flow restriction 32 of the first fluid channel 29 is arranged in the diverter unit 40.

In FIG. 5, the first fluid channel 29 provides a further flow restriction by comprising a bend 44 so that the first fluid channel forms an angle v of less than 90°.

In another embodiment, the first fluid channel 29 provides the flow restriction by having a decrease in the cross-sectional flow area A3 of the first fluid channel. Hereby, the flow velocity is increased causing a pressure drop, and the higher the velocity, the higher the pressure drop.

In yet another embodiment, the first fluid channel 29 has an increased cross-sectional flow area A3 upstream of the second aperture 28 for providing the flow restriction creating the pressure drop at the second aperture 28.

In yet another embodiment, the first fluid channel is longer than the second fluid channel resulting in a higher flow restriction in the first fluid channel than in the second fluid channel. Also, the inner diameter of the first fluid channel may be slightly smaller than that of the second fluid channel resulting in a higher flow restriction in the first fluid channel than in the second fluid channel.

In FIG. 7, the valve system further comprises a closing valve 10 comprising a first opening 16 in fluid communication with the expansion opening 12, a second opening 17 in fluid communication with the annular space 9, and a valve bore 18 having a bore extension 20C and comprising a first bore part 19 having a first inner diameter $ID_1$ and a second bore part 20B having a second inner diameter $ID_2$ which is larger than that of the first bore part. The first opening 16 and the second opening 17 are arranged in the first bore part 19 and displaced along the bore extension. The closing valve 10 further comprises a valve piston 121 arranged in the bore 18. The valve piston comprises a first piston part 122 having an outer diameter $OD_1$ substantially corresponding to the inner diameter $ID_1$ of the first bore part 19 and comprises a second piston part 123 having an outer diameter $OD_2$ substantially corresponding to the inner diameter $ID_2$ of the second bore part 20B. The closing valve 10 further comprises a rupture element 124 preventing movement of the valve piston 121 until a predetermined pressure in the valve bore 18 is reached. The predetermined pressure in the valve bore is reached when the expandable metal sleeve 8 abuts the wall of the borehole or another well tubular metal structure, and thus, a pressure builds up until the rupture element 124 breaks/ruptures and the piston is allowed to move, closing the first opening 16.

The first fluid channel 29 extends through the first opening 16 of the closing valve 10, the first bore part 19 of the closing valve 10, and the second opening 17 to the second aperture 28 of the isolation valve 21. The expandable metal sleeve is expanded by pressurising at least a part of the well tubular metal structure opposite the expansion opening 12 and fluid flows into the annular space from the expansion opening 12 via the first fluid channel 29 and out through the first aperture 27 fluidly connected with the annular space 9. Once the expandable metal sleeve abuts the wall of the borehole, the pressure is built up breaking the rupture element 124 of the closing valve 10 in that the pressure acts on the second piston part 123 from behind the valve piston 121 through a piston fluid channel 125 in the valve piston. Then, the valve piston 121 moves from the first and initial position to the second position closing the first fluid channel 29 and the first opening 16, the movement opening fluid communication between the second opening 17, the annular space 9 and a third opening 39. The third opening 39 is in fluid communication with the annulus. When the annular space 9 is brought into fluid communication with the annulus (borehole), the second aperture 28 and the first bore part 24 experience a pressure drop, and the second bore part 25 is still exposed to the high expansion pressure from the expansion opening 12 creating a pressure difference across the isolation piston 23 breaking the shear element 26, and the isolation piston 23 thus moves to the second position of the isolation valve 21. In the second position of the isolation piston, the second aperture 28 and the annular space 9 are once again brought into fluid communication with the annulus (borehole) through a fourth aperture 38 and a connecting fluid channel 51, which is fluidly connected with the third opening 39 of the closing valve 10. The fourth aperture 38 is connected with the third opening 39 in the closing valve via the valve bore 18, which third opening 39 is in fluid communication with the annulus.

Thus, the isolation valve may be closed, i.e. move to the second position, due to a rupture in the expandable metal sleeve of that annular barrier as the increase in flow rate out of the rupture creates a pressure difference across the isolation piston 23 shearing the shear element. However, the isolation valve may also close, i.e. move to the second position, after the closing valve 10 has closed as the closing valve then causes a pressure difference across the isolation piston 23 shearing the shear element.

The closing valve 10 further comprises a locking element 43 adapted to mechanically lock the valve piston 121 when the valve piston is in the closed position, blocking the first opening 16. The locking element is configured to move at least partly radially outwards or inwards upon movement of the piston away from the initial position to prevent the valve piston from returning to an initial position of the valve piston. The locking element permanently locks the valve piston in a closed position.

The locking element 43 of the closing valve and the isolation valve 21 may be collets forced radially inwards by an annular spring on the outside of the locking elements. The piston fluid channel 125 is a through bore providing fluid communication between the first and second bore parts. The valve piston has a centre axis 111 arranged in a wall of the tubular part or in a wall of a connection part 26B (shown in FIG. 1) connecting ends 14 of the expandable metal sleeve with the tubular part. The rupture element is a shear pin engaging the valve piston.

As shown in FIG. 1, the annular barrier 1 when expanded divides the annulus into a first zone 101 and a second zone 102. The annular barrier further comprises an anti-collapsing unit 60, as shown in FIG. 8. The anti-collapsing unit has a first inlet 61 which is in fluid communication with the first zone 101 and a second inlet 62 which is in fluid communication with the second zone 102. The anti-collapsing unit 60 has an outlet 63 which is in fluid communication with the annular space 9. In a first position, the first inlet is in fluid communication with the outlet, equalising the first pressure P1 (shown in FIG. 1) of the first zone with a space pressure Ps (shown in FIG. 1) of the annular space, and in a second position, the second inlet is in fluid communication with the outlet, equalising the second pressure P2 (shown in FIG. 1) of the second zone with the space pressure. The outlet 63 is in fluid communication with the annular space 9 through the third opening 39 and the fourth aperture 38. The outlet is fluidly connected with the fourth aperture 38 via the connecting fluid channel 51 and the third opening 39. The anti-collapsing unit 60 comprises an element 64 which is movable at least between a first position and a second position.

In FIG. 9, part of the annular barrier 1 is shown with the valve system 20 receiving fluid from the diverter unit 40 through a filtering element 42. The fluid enters the first opening 16 and out through the first aperture 27 into the annular space underneath the expandable metal sleeve 8. The anti-collapsing unit 60 is connected with the third opening 39. The valve system and the anti-collapsing unit are connected by means of fluid conduits running on the outer face of the tubular metal part 7.

In FIG. 5, the diverter unit 40 comprises a filtering element 42 for filtering fluid from the expansion opening 12 before the fluid is diverted into the first fluid channel 29 and the second fluid channel 31 or for filtering fluid from the annulus before entering the valve system 20 or the anti-collapsing unit 60.

In another embodiment, the isolation piston 23 comprises the first piston part 122 and the second piston part 123, the first piston part extending into the first opening 16 for sealing engaging the inner face 37 of the first opening 16. The first piston part has three sealing elements arranged with a mutual distance between both the first and the second sealing elements and a distance between the second and third sealing elements along an outer face of the isolation piston. The mutual distance is equal to or larger than the second opening 17. The three sealing elements are arranged with a mutual distance along an outer face of the isolation piston so that the first sealing element engages the inner face of the first opening, and the third sealing element sealingly engages an inner face of the first bore part when straddling over the second opening 17.

Thus, the isolation piston 23 comprises the first, second and third sealing elements arranged with a mutual distance along an outer face of the isolation piston, and when moving past the second opening 17, the first sealing element is arranged so that the first sealing element having passed the second opening 17 engages with an inner face of the isolation bore 22 before the third sealing element moves past the second opening 17 so that the first sealing element is pressure equalised experiencing the expansion pressure on both sides of the first sealing element even after the second sealing element engages the inner face after having passed the second opening 17 as the first and second sealing element isolate the expansion pressure between them.

FIG. 1 shows a downhole system 100 comprising the annular barrier 1 and the well tubular metal structure 3. The well tubular metal structure may have several annular barriers and an inflow section between two annular barriers for letting fluid from an isolated zone into the well tubular metal structure.

By fluid or well fluid is meant any kind of fluid that may be present in oil or gas wells downhole, such as natural gas, oil, oil mud, crude oil, water, etc. By gas is meant any kind of gas composition present in a well, completion or open hole, and by oil is meant any kind of oil composition, such as crude oil, an oil-containing fluid, etc. Gas, oil and water fluids may thus all comprise other elements or substances than gas, oil and/or water, respectively.

By a casing, production casing, liner or well tubular metal structure is meant any kind of pipe, tubing, tubular, liner, string, etc. used downhole in relation to oil or natural gas production.

In the event that the tool is not submergible all the way into the casing, a downhole tractor can be used to push the tool all the way into position in the well. The downhole tractor may have projectable arms having wheels, wherein the wheels contact the inner surface of the casing for propelling the tractor and the tool forward in the casing. A downhole tractor is any kind of driving tool capable of pushing or pulling tools in a well downhole, such as a Well Tractor®.

Although the invention has been described in the above in connection with preferred embodiments of the invention, it will be evident for a person skilled in the art that several modifications are conceivable without departing from the invention as defined by the following claims.

The invention claimed is:

1. An annular barrier for providing zonal isolation in an annulus in a well downhole between a well tubular metal structure and another well tubular metal structure or a wall of a borehole, comprising:
   a tubular metal part configured to be mounted as part of the well tubular metal structure,
   an expandable metal sleeve connected with and surrounding the tubular metal part forming an annular space therebetween, the expandable metal sleeve is configured to be expanded in the well downhole from a first outer diameter to a second outer diameter to abut against the well tubular metal structure or the wall of the borehole, and
   an expansion opening in the tubular metal part,
   wherein the annular barrier further comprises a valve system comprising:

an isolation valve having a first position and a second position, comprising:
an isolation bore,
an isolation piston arranged in the isolation bore dividing the bore into a first bore part and a second bore part in the first position, the isolation piston is maintained in the first position by a shear element configured to break at a predetermined pressure difference between the first bore part and the second bore part,
a first aperture arranged in the first bore part and being in fluid communication with the annular space,
a second aperture arranged in the first bore part and being in fluid communication with the expansion opening through a first fluid channel,
a third aperture arranged in the second bore part and being in fluid communication with the expansion opening through a second fluid channel,
wherein in the first position the first aperture is in fluid communication with the second aperture, and in the second position the isolation piston prevents fluid communication between the first aperture and the second aperture.

2. The annular barrier according to claim 1, wherein the first fluid channel comprises a flow restriction.

3. The annular barrier according to claim 1, wherein the isolation piston has a first piston end facing the first bore part and a second piston end facing the second bore part, the first piston end having a projected area being of substantially the same size as a projected area of the second piston end.

4. The annular barrier according to claim 1, wherein the first fluid channel provides the flow restriction by having a decrease in a cross-sectional flow area of the first fluid channel.

5. The annular barrier according to claim 1, wherein the first fluid channel provides the flow restriction by comprising a bend so that the first fluid channel forms an angle of less than 90°.

6. The annular barrier according to claim 1, wherein the isolation valve comprises a fourth aperture which is in fluid communication with the annulus.

7. The annular barrier according to claim 1, wherein the valve system further comprises a diverter unit in fluid communication with the expansion opening, the diverter unit dividing fluid from the expansion opening to the first fluid channel and the second fluid channel.

8. The annular barrier according to claim 7, wherein the diverter unit comprises a unit chamber receiving fluid from the expansion opening and is in fluid communication with the first fluid channel and the second fluid channel.

9. The annular barrier according to claim 8, wherein the first fluid channel provides the flow restriction by having a cross-sectional flow area smaller than a cross-sectional flow area of the unit chamber.

10. The annular barrier according to claim 9, wherein the valve piston comprises a piston fluid channel being a through bore providing fluid communication between the first and second bore parts.

11. The annular barrier according to claim 9, wherein the annular barrier comprises a third opening which is in fluid communication with the annulus.

12. The annular barrier according to claim 1, wherein the valve system further comprises a closing valve comprising:
a first opening in fluid communication with the expansion opening,
a second opening in fluid communication with the annular space, and
a valve bore having a bore extension and comprising a first bore part having a first inner diameter and a second bore part having a second inner diameter which is larger than that of the first bore part,
wherein the first opening and the second opening are arranged in the first bore part and displaced along the bore extension, the closing valve further comprising:
a valve piston arranged in the bore, the valve piston comprising a first piston part having an outer diameter substantially corresponding to the inner diameter of the first bore part and comprising a second piston part having an outer diameter substantially corresponding to the inner diameter of the second bore part, and
a rupture element preventing movement of the valve piston until a predetermined pressure in the valve bore is reached.

13. The annular barrier according to claim 12, wherein the closing valve further comprising a locking element adapted to mechanically lock the valve piston when the valve piston is in the closed position, blocking the first opening.

14. The annular barrier according to claim 1, wherein the annular barrier when expanded divides the annulus into a first zone and a second zone, said annular barrier further comprises an anti-collapsing unit, the anti-collapsing unit having a first inlet which is in fluid communication with the first zone and a second inlet which is in fluid communication with the second zone, and the anti-collapsing unit having an outlet which is in fluid communication with the annular space, and in a first position, the first inlet is in fluid communication with the outlet, equalising the first pressure of the first zone with a space pressure of the annular space, and in a second position, the second inlet is in fluid communication with the outlet, equalising the second pressure of the second zone with the space pressure.

15. Downhole system comprising the annular barrier according to claim 1 and the well tubular metal structure.

* * * * *